(12) United States Patent
Tsubone

(10) Patent No.: US 6,189,923 B1
(45) Date of Patent: Feb. 20, 2001

(54) MANUAL CUT-OFF SYSTEM AND METHOD FOR PASSIVE SAFETY DEVICES

(75) Inventor: Kenji Tsubone, Okazaki (JP)

(73) Assignee: Toyota Jidosha Kabushiki Kaisha, Toyota (JP)

( * ) Notice: Under 35 U.S.C. 154(b), the term of this patent shall be extended for 0 days.

(21) Appl. No.: 09/192,200

(22) Filed: Nov. 16, 1998

(30) Foreign Application Priority Data

Feb. 13, 1998 (JP) ................................................ 10-031227

(51) Int. Cl.$^7$ .................................................... B60R 21/32
(52) U.S. Cl. ......................... 280/735; 280/806; 180/282; 701/45
(58) Field of Search .................................. 280/735, 734, 280/806; 180/282; 701/45

(56) References Cited

U.S. PATENT DOCUMENTS

| | | | |
|---|---|---|---|
| 5,085,464 | * 2/1992 | Behr et al. | 280/735 |
| 5,324,074 | 6/1994 | Christian et al. | |
| 5,544,914 | 8/1996 | Borninski et al. | |
| 5,794,972 | * 8/1998 | Katzin | 280/735 |
| 5,803,491 | * 9/1998 | Barnes et al. | 280/735 |
| 5,879,024 | * 3/1999 | Estep | 280/735 |
| 5,918,899 | * 7/1999 | Watanabe | 280/735 |
| 5,992,880 | * 11/1999 | Cuddihy et al. | 280/735 |

FOREIGN PATENT DOCUMENTS

| | | |
|---|---|---|
| 0 719 680 A1 | 7/1996 | (EP) . |
| 8-34310 | 2/1996 | (JP) . |
| 8-318814 | 12/1996 | (JP) . |
| 9-156461 | 6/1997 | (JP) . |

* cited by examiner

Primary Examiner—Paul N. Dickson
(74) Attorney, Agent, or Firm—Oliff & Berridge, PLC

(57) ABSTRACT

A manual cut-off system makes it possible to manually change operability of each of a plurality of passive safety devices, including air bags. The system aims at accurately maintaining operability of each of the passive safety devices until the air bags are required to operate. If a multistage switch for changing operability of each of the passive safety devices, including air bags, assumes a position for preventing operation of predetermined ones of the passive safety devices, ignition signals are prevented from being outputted to squibs corresponding to those predetermined passive safety devices. A CPU detects a state of the multistage switch based on the voltage between a common contact and a connecting portion of resistors. The thus-detected state of the multistage switch is stored in an IC memory.

13 Claims, 1 Drawing Sheet

MANUAL CUT-OFF SYSTEM AND METHOD FOR PASSIVE SAFETY DEVICES

INCORPORATION BY REFERENCE

The disclosure of Japanese Patent Application No. HEI 10-31227, filed on Feb. 13, 1998, including the specification, drawings and abstract is incorporated herein by reference in its entirety.

BACKGROUND OF THE INVENTION

1. Field of Invention

The present invention relates to a manual cut-off system for passive safety devices and, more particularly, relates to such a system suited to accurately maintain operability of each of a plurality of air bags even after those air bags have been required to operate. The present invention also relates to a manual cut-off method for passive safety devices.

2. Description of Related Art

For example, U.S. Pat. No. 5,544,914 discloses a system wherein a vehicle passenger can manually change operability of an air bag.

The system according to this related art is equipped with a fuse connected in parallel with a squib corresponding to the air bag and a switch for selectively connecting a source of ignition signals to the squib or the fuse. When the air bag is required to operate, the source of ignition signals generates an ignition signal that is sufficient to ignite the squib and cut the fuse. The switch connects the source of ignition signals to the squib before the vehicle passenger requires that the air bag be capable of operation. On the other hand, if the vehicle passenger requires that the air bag be prevented from operating, the switch connects the source of ignition signals to the fuse.

If the air bag is required to be deployed under the circumstance where the vehicle passenger demands operation of the air bag, the ignition signal generated by the aforementioned source is supplied to the squib, thus deploying the air bag. On the other hand, if the air bag is required to be deployed under the circumstance where the vehicle passenger demands prevention of operation of the air bag, the ignition signal generated by the source is supplied to the fuse, thus cutting the fuse without deploying the air bag.

Hence, it is possible to determine whether or not the vehicle passenger had demanded prevention of operation of the air bag before a requirement for deployment thereof, by checking whether or not the fuse has been cut after the requirement for deployment of the air bag.

However, a surge current or a noise current may flow through the fuse. Thus, there is a possibility of the fuse being cut before arrival of the ignition signal. On the contrary, even if the ignition signal has been supplied to the fuse, the fuse may not be cut owing to, for example, characteristic errors or the like. Therefore, according to a system wherein the state manually set by the vehicle passenger is determined based on the state of the fuse, there is a possibility of an inaccurate judgement being made.

In addition, the system according to the related art is incapable of determining whether or not the switch for connecting the source of ignition signals to one of the squib and the fuse is in normal operation. Hence, even if there is a failure in the switch, the vehicle passenger is not informed of such a failure immediately.

Furthermore, in the case where a plurality of air bags are mounted to the vehicle, the system according to the related art requires that a plurality of switches and fuses be provided in correspondence with the respective air bags (as well as the respective squibs). For this reason, if the system according to the related art is employed in the case where a plurality of air bags are provided, the overall dimension of the system may increase substantially.

SUMMARY OF THE INVENTION

The present invention has been made in consideration of the aforementioned background. It is a first object of the present invention to provide a manual cut-off system that is applied to passive safety devices and reliably maintains manipulation states concerning operability of the passive safety devices, which include air bags. It is a second object of the present invention to provide a manual cut-off system that is applied to passive safety devices and is capable of immediately detecting a failure in a switch for changing operability of each of the passive safety devices.

Furthermore, it is a third object of the present invention to provide a manual cut-off system that is applied to passive safety devices and has a compact body (shape) even in the case where a plurality of passive safety devices, such as air bags, pretensioners and the like are mounted to the vehicle.

In order to achieve the first object, the manual cut-off system of the present invention is characterized by including passive safety devices, a switch that changes operability of each of the passive safety devices, a memory that stores a state of the switch, and a controller that prevents operation of control devices corresponding to those of the passive safety devices which are prevented from operating due to manipulation of the switch.

According to the aforementioned construction, if the vehicle passenger sets the switch to a position for preventing operation of some of the passive safety devices, control devices corresponding to those passive safety devices are prevented from operating. For example, in the case where those passive safety devices are air bags, an ignition signal is prevented from being supplied to squibs that are designed to deploy those air bags. Hence, if the switch is manipulated as described above, it is possible to prevent operation of the passive safety devices, regardless of whether they are required to operate. The state of the switch is stored in the memory. Accordingly, the state of the switch prior to a requirement for operation of the passive safety devices is reliably maintained even after the requirement has been established.

It is also effective to provide a memory lock for locking contents stored in the memory after the passive safety devices have been required to operate. According to this construction, the state of the switch stored in the memory is locked after a requirement for operation of the passive safety devices has been established. In this case, the contents stored in the memory cannot be changed after the requirement for operation of the passive safety devices has been established, so that the state of the switch is accurately maintained in the memory.

In addition to the aforementioned aspect, the second object is achieved by providing the manual cut-off system with a constant-current supplier that supplies a predetermined constant current to the switch, a plurality of system state indicators selectively connected to the switch, a plurality of resistors selectively connected to the switch, and a failure diagnosis controller that diagnoses a failure in a system including the switch, based on a voltage drop level determined in accordance with the constant current and a resistance value of one of the resistors.

According to the aforementioned construction, the constant current that has been supplied from the constant-current supplier flows through the switch, the system state indicator and the resistor connected to the switch. In this case, regardless of the state of the switch, the constant current always flows through the system state indicator. Thus, the system state indicator always emits light of a constant brightness. When the constant current that has been supplied from the constant-current supplier properly flows through the switch, the system state indicator and the resistor connected to the switch, the voltage drops by a level substantially corresponding to the resistance value of that resistor. In the present invention, it is determined accurately whether or not the switch is in normal operation, by checking whether or not the voltage drop level is suited for the constant current.

In addition to the aforementioned aspect, the third object is achieved by a construction wherein the passive safety devices include a plurality of air bags and at least one or more pretensioners and wherein the switch is a single multistage switch having a plurality of operation-preventing positions for preventing operation of a suitable combination of the air bags and the pretensioners.

According to this construction, a plurality of passive safety devices are mounted to the vehicle, and the respective passive safety devices are prevented from operating in a combination corresponding to each stage of the multistage switch. In this case, the single multistage switch changes the combination of the passive safety devices to be prevented from operating. Hence, it is possible to prevent the manual cut-off system from becoming bulky and to finely change operability of each of the passive safety devices.

BRIEF DESCRIPTION OF THE DRAWINGS

The foregoing and further objects, features and advantages of the present invention will become apparent from the following description of a preferred embodiment with reference to the accompanying drawing, wherein.

DETAILED DESCRIPTION OF PREFERRED EMBODIMENTS

Figure 1:
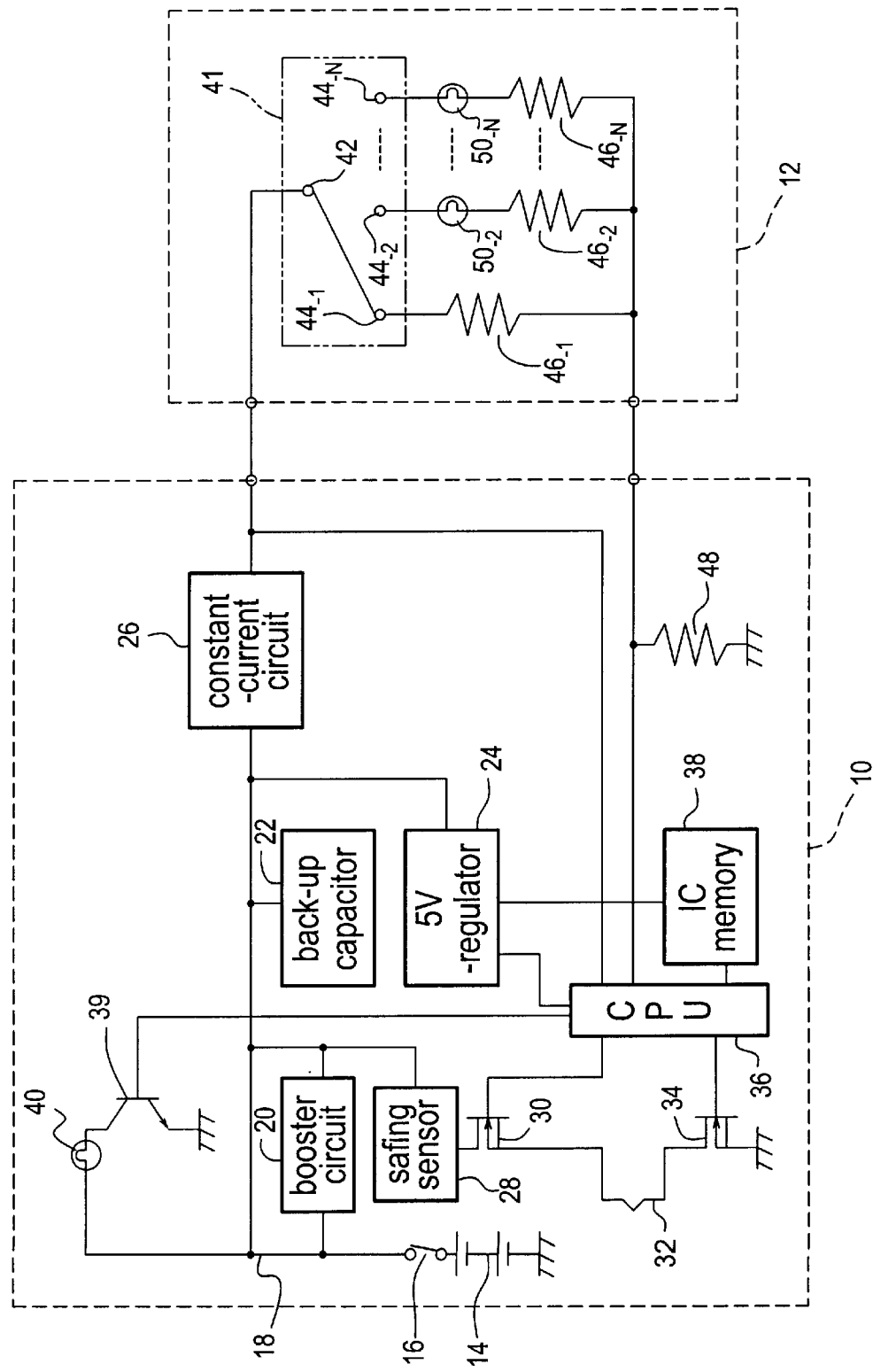
FIG. 1 is a circuit diagram of a manual cut-off system for air bags according to one embodiment of the present invention.

FIG. 1 is a circuit diagram of an essential part of an manual cut-off system for air bags according to an embodiment of the present invention. The system according to this embodiment is equipped with an air bag system 10 and a cut-off system 12. The air bag system 10 is provided with a battery 14, which is connected to an ignition switch 16. The ignition switch 16 is connected to a supply voltage line 18 and a booster circuit 20. If the battery voltage drops below a desired level that has been set by the air bag system 10, the booster circuit 20 raises the battery voltage to the desired level. The output voltage outputted from the booster circuit 20 is supplied to the supply voltage line 18.

The supply voltage line 18 is connected to a back-up capacitor 22 and a 5V-regulator 24. The back-up capacitor 22 is designed to store electric power that is necessary to operate the air bag system 10 in case of a failure in a power supply system. The 5V-regulator 24 converts a voltage applied to the supply voltage line 18 into 5V. The supply voltage line 18 is further connected to a constant-current circuit 26, whose output terminal always outputs a constant current.

The supply voltage line 18 is connected to a safing sensor 28, which is a mechanical acceleration sensor incorporating a contact that is turned on when an acceleration exceeding a predetermined value acts on the vehicle in a predetermined direction. The safing sensor 28 is connected to a first switching element 30, which is connected to a squib 32. The squib 32 is connected to a second switching element 34. The squib 32 is a member for igniting an inflator of the air bag. In the airbag system 10 of this embodiment, a plurality of air bags and a plurality of pretensioners (not shown) are disposed. The air bags are designed to come out of a front part of a driver's seat, a front part of an assistant driver's seat, a right part of the vehicle and a left part of the vehicle respectively, and the pretensioners are designed for the driver's seat, the assistant driver's seat and the like. For each one of the plurality of air bags and pretensioners (hereinafter referred to as passive safety devices as a whole), the air bag system 10 has a sating sensor, first and second switching elements, and a squib. In the following description, the constructions and operations of only those components shown in the drawing, i.e., the safing sensor 28, the first and second switching elements 30, 34, and the squib 32 will be explained.

The air bag system 10 is provided with a CPU 36, to which a driving current of 5V is applied by the SV-regulator 24. The first and second switching elements 30, 34 are connected to the CPU 36. The CPU 36 is also connected to an electric acceleration sensor, which is not shown. The CPU 36 outputs on-signals to the first and second switching elements 30, 34 based on an output signal from the electric acceleration sensor, when it can be determined that an acceleration exceeding a predetermined value acts on the vehicle in a predetermined direction.

If the safing sensor 28 is turned on and the first and second switching elements 30, 34 are also turned on, the supply voltage line 18 supplies an ignition current to the squib 32. Hence, the air bag system 10 can deploy the air bags in correspondence with the squib 32 when both the safing sensor 28 and the electric acceleration sensor detect a predetermined acceleration.

The CPU 36 is connected to an IC memory 38, to which a voltage of 5V is applied by the 5V-regulator 24. When the ignition switch 16 is turned on, the CPU 36 writes data representative of a state of a later-described multistage switch into the IC memory 38. If the passive safety devices installed in the air bag system 10 are required to operate, the CPU 36 locks contents stored in the IC memory 38 and prevents them from being rewritten. Accordingly, the IC memory 38 stores a state of the multistage switch before the passive safety devices are required to operate.

In addition, the CPU 36 is connected to a warning lamp 40 via a transistor 39. The warning lamp 40 is also connected to the aforementioned supply voltage line 18. If a failure is detected around the periphery of the multistage switch according to a later-described method, the CPU 36 turns on the transistor 39. When the transistor 39 is turned on, the warning lamp 40 is lit up. Thus, the system according to this embodiment is able to inform a vehicle passenger of a failure around the periphery of the multistage switch by means of the warning lamp 40.

The cut-off system 12 is equipped with a multistage switch 41, which has a common contact 42 and a plurality of change-over contacts 44-i (i=1~N). The multistage switch 41 is a switching mechanism that connects the common contact 42 to one of the change-over contacts 44-i (i=1~N) when operated by the vehicle passenger. The multistage switch 41 is a key switch that is brought into operation by an ignition key of the vehicle. Hence, it is generally impossible to change the state of the multistage switch 41 after engine start.

The common contact 42 of the multistage switch 41 is connected to the constant-current circuit 26 and the CPU 36 of the air bag system 10. The change-over contacts 44-i (i=1~N) of the multistage switch 41 are connected to a plurality of resistors 46-i (i=1~N) respectively, whose resistance values are different from one another. The resistors 46-i (i=1~N) are grounded via a resistor 48 and connected to the CPU 36. The change-over contacts 44-i(i=2~N) except for the change-over contact 44-1 are connected to lightemitting diodes 50-i (i=2~N), which serve as a system state indicator for indicating a state of the cut-off system 12. The light-emitting diodes 50-i (i=2~N) are connected in series to the resistors 46-i (i=2~N). In the system according to this embodiment, the constant-current circuit 26 always supplies a constant current to the common contact 42 of the multistage switch 41 regardless of the state of the multistage switch 41. Hence, between the common contact 42 of the multistage switch 41 and connecting portions where the resistors 46-i (i=1~N) are connected to the resistor 48, the voltage drops by a level corresponding to the product of the aforementioned constant current and a resistance value of each of the resistors through which the constant current flows.

The voltage at the common contact 42 and the voltage at the connecting portions where the resistors 46-i (i=1~N) are connected to the resistor 48 are supplied to the CPU 36. Thus, the CPU 36 can detect a level by which the voltage drops before the constant current that has flown into the multistage switch 41 reaches the resistor 48. The aforementioned voltage drop level corresponds to a resistance value of the resistor through which the constant current has flown. Thus, based on the aforementioned voltage drop level, the CPU 36 can detect which of the resistors is supplied with the constant current, that is, which of the change-over contacts 44-i (i=1~N) is in contact with the common contact 42 of the multistage switch 41. In this embodiment, the change-over contact 44-1 of the multistage switch 41 is provided in consideration of the case where all the air bags and pretensioners are required to operate. In other words, in the case where all the air bags and pretensioners are required to operate, the vehicle passenger needs to manipulate the multistage switch 41 such that the common contact 42 comes into contact with the change-over contact 44-1.

If it is determined based on the voltage supplied from the cut-off system 12 that the common contact 42 is in contact with the change-over contact 44-1, the CPU 36 turns on the first and second switching elements corresponding to all the passive safety devices, on the premise that the operational conditions of the individual passive safety devices are satisfied. Thus, the system according to this embodiment makes it possible to suitably operate all the passive safety devices in the case where the multistage switch 41 is manipulated such that the common contact 42 comes into contact with the change-over contact 44-1.

The change-over contact 44-2 of the multistage switch 41 is provided in consideration of, for example, the case where the air bag that is designed to come out of the assistant driver's seat is prevented from operating. In other words, in the case where only the air bag that is designed to come out of the assistant driver's seat is prevented from operating, the vehicle passenger needs to manipulate the multistage switch 41 such that the common contact 42 comes into contact with the change-over contact 44-2.

If it is determined based on the voltage supplied from the cut-off system 12 that the common contact 42 is in contact with the change-over contact 44-2, the CPU 36 prevents the first and second switching elements corresponding to the air bag that is designed to come out of the assistant driver's seat from being turned on, even if the operational condition of that air bag is satisfied. Thus, the system according to this embodiment makes it possible to reliably prevent the operation of the air bag that is designed to come out of the assistant driver's seat in the case where the multistage switch 41 is manipulated such that the common contact 42 comes into contact with the change-over contact 44-2.

Likewise, each of the other contacts 44-i (i=3~N) incorporated in the multistage switch 41 is provided in correspondence with a certain combination of the passive safety devices that are installed in the vehicle. More specifically, each of the other contacts 44-i (i=3~N) is provided in correspondence with a certain combination of those passive safety devices which are to be prevented from operating. Thus, the vehicle passenger needs to manipulate the multistage switch 41 such that the common contact 42 comes into contact with a suitable one of the change-over contacts 44-i (i=3~N), in accordance with a combination of those passive safety devices which are to be prevented from operating.

If it is determined based on the voltage supplied from the cut-off system 12 that the common contact 42 is in contact with one of the change-over contacts 44-i (i=3~N), the CPU 36 prevents the first and second switching elements of the passive safety device corresponding to the aforementioned one of the change-over contacts from being turned on. Thus, the system according to this embodiment makes it possible to prevent the operation of a suitable combination of the passive safety devices in accordance with an operational state of the multistage switch 41.

As described above, the IC memory 38 stores a state of the multistage switch 41. If the passive safety devices are required to operate, the contents stored in the IC memory 38 are locked. Thus, the system according to this embodiment makes it possible to provide the vehicle passenger with a high degree of freedom in setting the operability of each of the air bags and pretensioners, and to maintain those demands which have been made by the vehicle passenger prior to establishment of a requirement to operate the passive safety devices, even after establishment of that requirement.

As described above, the system according to this embodiment is provided with the light-emitting diodes 50-i (i=2~N) corresponding to the change-over contacts 44-i (i=2~N) of the multistage switch 41 respectively. Each of the light-emitting diodes 50-i (i=2~N) corresponds to a combination of those passive safety devices which are to be prevented from operating in accordance with an operational state of the multistage switch 41. More specifically, each of the light-emitting diodes 50-i (i=2~N) is lit up so as to inform the vehicle passenger of a combination of those passive safety devices which are to be prevented from operating. Therefore, the vehicle passenger can easily recognize which passive safety devices are prevented from operating, by checking which of the light-emitting diodes 50-i (i=2~N) is lit up.

The system according to this embodiment performs control such that the current flowing through the light-emitting diodes 50-i (i=2~N) always assumes a constant value. Hence, the light-emitting diodes 50-i (i=2~N) are controlled to exhibit substantially an equal brightness, regardless of the control state of the multistage switch 41.

Furthermore, in the system according to this embodiment, if the multistage switch 41 undergoes a contact failure or the resistors 46-i (i=1~N) are unfavorably short-circuited, the cut-off system 12 supplies to the CPU 36 a voltage that cannot be generated when the multistage switch 41 operates properly. Thus, the CPU 36 can determine if there is a failure around the periphery of the multistage switch 41 by checking whether or not the voltage supplied from the cut-off system 12 assumes a suitable value. In case of such a failure as described above, the system according to this embodiment is able to inform the vehicle passenger of a state of the failure through the warning lamp 40. Hence, the system according to this embodiment eliminates the possibility of a failure around the periphery of the multistage switch 41 being left as it is, and therefore ensures a high degree of reliability.

In the system according to this embodiment, the multistage switch 41 is the only component that controls operational states of a plurality of passive safety devices. It is preferable that the switch for changing operational states of the passive safety devices be constructed such that the operational state of the switch is not changed by accident. In consideration of the fact that a key switch necessitates a key cylinder, if a plurality of key cylinders are used to finely change operational states of a plurality of passive safety devices, the system becomes bulky and requires an ample space. However, as is the case with the system according to this embodiment, if the single multistage switch 41 is used to control the states of a plurality of passive safety devices, it is possible to achieve a desired change-over function with a compact system. Thus, the system according to this embodiment is advantageous in terms of size reduction. On the other hand, a structure other than that of the key switch can also be employed as means for preventing a state of the switch from being changed by accident. For example, the switch can be disposed within a dash-board that is equipped with a key. Even if the switch has a structure other than that of the key switch, it is possible to prevent a state of the switch from being changed by accident by installing the switch in a specific space.

While the present invention has been described with reference to what is presently considered to be a preferred embodiment thereof, it is to be understood that the present invention is not limited to the disclosed embodiment or construction. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. A manual cut-off system for passive safety devices, comprising:
   passive safety devices;
   a switch that changes operability of each of said passive safety devices;
   a memory that stores a state of said switch;
   a controller that prevents operation of each of said passive safety devices that is prevented from operating due to manipulation of said switch; and
   a memory lock that locks contents stored in said memory after said passive safety devices have been required to operate.

2. The manual cut-off system according to claim 1,
   wherein said passive safety devices comprise a plurality of air bags and at least one pretensioner, and
   wherein said switch is a single multistage switch having a plurality of operation-preventing positions that prevent operation of a suitable combination of said air bags and said at least one pretensioner.

3. A manual cut-off system for passive safety devices comprising:
   passive safety devices;
   a switch that changes operability of each of said passive safety devices;
   a memory that stores a state of said switch;
   a controller that prevents operation of each of said passive safety devices that is prevented from operating due to manipulation of said switch;
   a plurality of system state indicators selectively connected to said switch;
   a plurality of resistors selectively connected to said switch; and
   a failure diagnosis controller that diagnoses a failure in a system including said switch, based on a voltage drop level determined in accordance with a constant current supplied to the switch and a resistance value of one of said resistors.

4. The manual cut-off system according to claim 3,
   wherein said passive safety devices comprise a plurality of air bags and at least one pretensioner, and
   wherein said switch is a single multistage switch having a plurality of operation-preventing positions that prevent operation of a suitable combination of said air bags and said at least one pretensioner.

5. A manual cut-off system for passive safety devices comprising:
   passive safety devices;
   a switch that changes operability of each of said passive safety devices;
   a memory that stores a state of said switch;
   a controller that prevents operation of each of said passive safety devices that is prevented from operating due to manipulation of said switch;
   wherein said passive safety devices comprise a plurality of air bags and at least one pretensioner, and
   wherein said switch is a single multistage switch having a plurality of operation-preventing positions that prevent operation of a suitable combination of said air bags and said at least one pretensioner.

6. A manual cut-off system for air bag systems, comprising:
   air bag systems;
   a switch that changes operability of each of said air bag systems;
   a memory that stores a state of said switch;
   a controller that prevents ignition signals from being outputted to squibs corresponding to each of said air bag systems that is prevented from operating due to manipulation of said switch; and
   a memory lock that locks contents stored in said memory after said air bag systems have been required to operate.

7. The manual cut-off system according to claim 6,
   wherein said air bag systems comprise a plurality of air bags, and
   wherein said switch is a single multistage switch having a plurality of operation-preventing positions that prevent operation of a suitable combination of said air bags.

8. A manual cut-off system for air bag systems, comprising:

air bag systems;

a switch that changes operability of each of said air bag systems;

a memory that stores a state of said switch;

a controller that prevents ignition signals from being outputted to squibs corresponding to each of said air bag systems that is prevented from operating due to manipulation of said switch;

a plurality of system state indicators selectively connected to said switch;

a plurality of resistors selectively connected to said switch; and a failure diagnosis controller that diagnoses a failure in a system including said switch, based on a voltage drop level determined in accordance with a constant current that is supplied to the switch and a resistance value of one of said resistors.

9. The manual cut-off system according to claim 8, wherein said air bag systems comprise a plurality of air bags, and wherein said switch is a single multistage switch having a plurality of operation-preventing positions that prevent operation of a suitable combination of said air bags.

10. A manual cut-off system for air bag systems, comprising:

air bag systems;

a switch that changes operability of each of said air bag systems;

a memory that stores a state of said switch;

a controller that prevents operation of each of said passive safety devices that is prevented from operating due to manipulation of said switch;

wherein said air bag systems comprise a plurality of air bags and at least one pretensioner and a memory lock; and wherein said switch is a single multistage switch having a plurality of operation-preventing positions that prevent operation of a suitable combination of said air bags and said at least one pretensioner.

11. A manual cut-off method for passive safety devices, comprising:

changing an operability state of any of said passive safety devices;

storing each said operability state of each of said passive safety devices into a memory;

preventing operation of each of said passive safety devices that is prevented from operating depending on said operability state of each of said passive safety devices; and locking contents stored in said memory after said passive safety devices have been required to operate.

12. A manual cut-off method for passive safety devices, comprising:

changing an operability state of any of said passive safety devices;

storing each said operability state of each of said passive safety devices into a memory;

preventing operation of each of said passive safety devices that is prevented from operating depending on said operability state of each of said passive safety devices;

selectively connecting a plurality of system state indicators to a switch;

selectively connecting a plurality of resistors to said switch; and diagnosing a failure in a system including said switch, based on a voltage drop level determined in accordance with a constant current supplied to the switch and a resistance value of one of said resistors.

13. A manual cut-off system for passive safety devices, comprising:

passive safety devices;

a switch that changes operability of each of said passive safety devices;

a memory that stores a state of said switch; and a memory lock that locks contents stored in said memory after said passive safety devices have been required to operate.

* * * * *